(12) United States Patent
He et al.

(10) Patent No.: US 11,782,787 B2
(45) Date of Patent: Oct. 10, 2023

(54) DYNAMIC ERROR CONTROL CONFIGURATION FOR MEMORY SYSTEMS

(71) Applicant: Micron Technology, Inc., Boise, ID (US)

(72) Inventors: Deping He, Boise, ID (US); Zhengang Chen, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 81 days.

(21) Appl. No.: 17/584,034

(22) Filed: Jan. 25, 2022

(65) Prior Publication Data

US 2023/0052044 A1    Feb. 16, 2023

Related U.S. Application Data

(60) Provisional application No. 63/232,982, filed on Aug. 13, 2021.

(51) Int. Cl.
*G06F 11/10*    (2006.01)
*G06F 11/07*    (2006.01)

(52) U.S. Cl.
CPC ........ *G06F 11/1068* (2013.01); *G06F 11/076* (2013.01); *G06F 11/0772* (2013.01); *G06F 11/0793* (2013.01)

(58) Field of Classification Search
CPC . G06F 11/0793; G06F 11/0772; G06F 11/076
See application file for complete search history.

(56) References Cited

U.S. PATENT DOCUMENTS

| | | | |
|---|---|---|---|
| 9,558,063 B2 * | 1/2017 | Kajigaya | G11C 13/0028 |
| 10,936,391 B2 * | 3/2021 | Hsiao | G11C 11/4087 |
| 10,998,920 B1 * | 5/2021 | Tate | H03M 13/1111 |
| 2014/0229794 A1 * | 8/2014 | Gurgi | G06F 11/1008 714/763 |
| 2018/0011753 A1 * | 1/2018 | Alhussien | H03M 13/6325 |

* cited by examiner

*Primary Examiner* — Guy J Lamarre
(74) *Attorney, Agent, or Firm* — Holland & Hart LLP (57) ABSTRACT

Methods, systems, and devices for a dynamic error control configuration for memory systems are described. The memory system may receive a read command and retrieve a set of data from a location of the memory system based on the read command. The memory system may perform a first type of error control operation on the set of data to determine whether the set of data includes one or more errors. If the set of data includes the one or more errors, the memory system may retrieve a second set of data from the location of the memory system and determine whether a syndrome weight satisfies a threshold. The memory system may perform a second type of error control operation on the second set of data based on determining that the syndrome weight satisfies the threshold.

25 Claims, 4 Drawing Sheets

DYNAMIC ERROR CONTROL CONFIGURATION FOR MEMORY SYSTEMS

CROSS REFERENCE

The present application for patent claims priority to U.S. Provisional Patent Application No. 63/232,982 by He et al., entitled "DYNAMIC ERROR CONTROL CONFIGURATION FOR MEMORY SYSTEMS", filed Aug. 13, 2021, which is assigned to the assignee hereof and is expressly incorporated by reference in its entirety herein.

FIELD OF TECHNOLOGY

The following relates generally to one or more systems for memory and more specifically to a dynamic error control configuration for memory systems.

BACKGROUND

Memory devices are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not—or (NOR) and not—and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

When storing information in an array of memory cells, a memory system may use an error control operation to ensure that the information is free from errors. The errors may be caused by writing the information in the array, disturbances that may occur while the information is stored in the array, or reading the information out of the array. Such error control operations may include a low-density parity check (LDPC). Some error control operations may have a lower latency, but also may be configured to detect or correct fewer errors than other error control operations. There may be trade-offs between using high-resolution error control operations that are configured to detect or correct many errors (and consume more power or energy) and using lower-resolution error control operation that are configured to detect or correct fewer errors, but which take less time and consume less power or energy. For example, if the memory system is configured to use a first type of error control operation (e.g., bit-flipping (BF) LDPC decoding) and/or second type of error control operation, the memory system may consume increased amounts of power and time to operate the second type of error control operation as compared to operating the first type of error control operation. However, the memory system may be able to detect or correct a greater quantity of bits using the second type of error control operation as compared to using the first type of error control operation. Techniques for selecting whether to perform a read operation using the first type of error control operation or using the second type of error control operation may be desired.

Techniques are described for performing a read operation using different types of error control operations in different situations. A memory system may first retrieve data and apply a first error control operation that has a lower-latency and a lower error detection or correction resolution. If the memory system identifies uncorrectable errors with the first error control operation, the memory system may apply a second error control operation that has a higher error detection or correction resolution. Such techniques may reduce a likelihood that the second type of error control operation is performed, thereby reducing the latency of commands associated with the memory system, reducing the power consumption of the commands, while maintaining the ability of the memory system to detect or correct a higher quantity of errors. For example, the memory system may perform a read operation using the first type of error control operation. The memory system may determine whether the read operation fails (e.g., whether the data includes one or more errors). In some cases, the memory system may determine that the read operation fails and may perform a read retry operation in response to determining that the read operation fails. The read retry operation may be performed using the first type of error control operation. The memory system may determine whether the read retry operation fails (e.g., whether the data includes one or more errors). In some examples, the memory system may determine that the read retry operation fails and may determine a syndrome weight associated with the first type of error control operation in response to determining that the read retry operation fails. If the syndrome weight satisfies a threshold, the memory system may perform a ready retry using the second type of error control operation. In other examples, if the syndrome weight fails to satisfy the threshold, the memory system may perform a read retry using the first type of error control operation.

By using a multi-stage configuration for error correction operations, the memory system may reduce the latency of operations associated with the memory system by determining whether to perform the read retry using the second type of error control operation based on the syndrome weight. Using the multi-stage configuration for error correction operations may improve the overall efficiency of the memory system, which may result in the memory system experiencing improved read, write, and erase speeds, reduced power consumption, improved processing times, reduced wear on memory cells, and the like.

Figure 1:
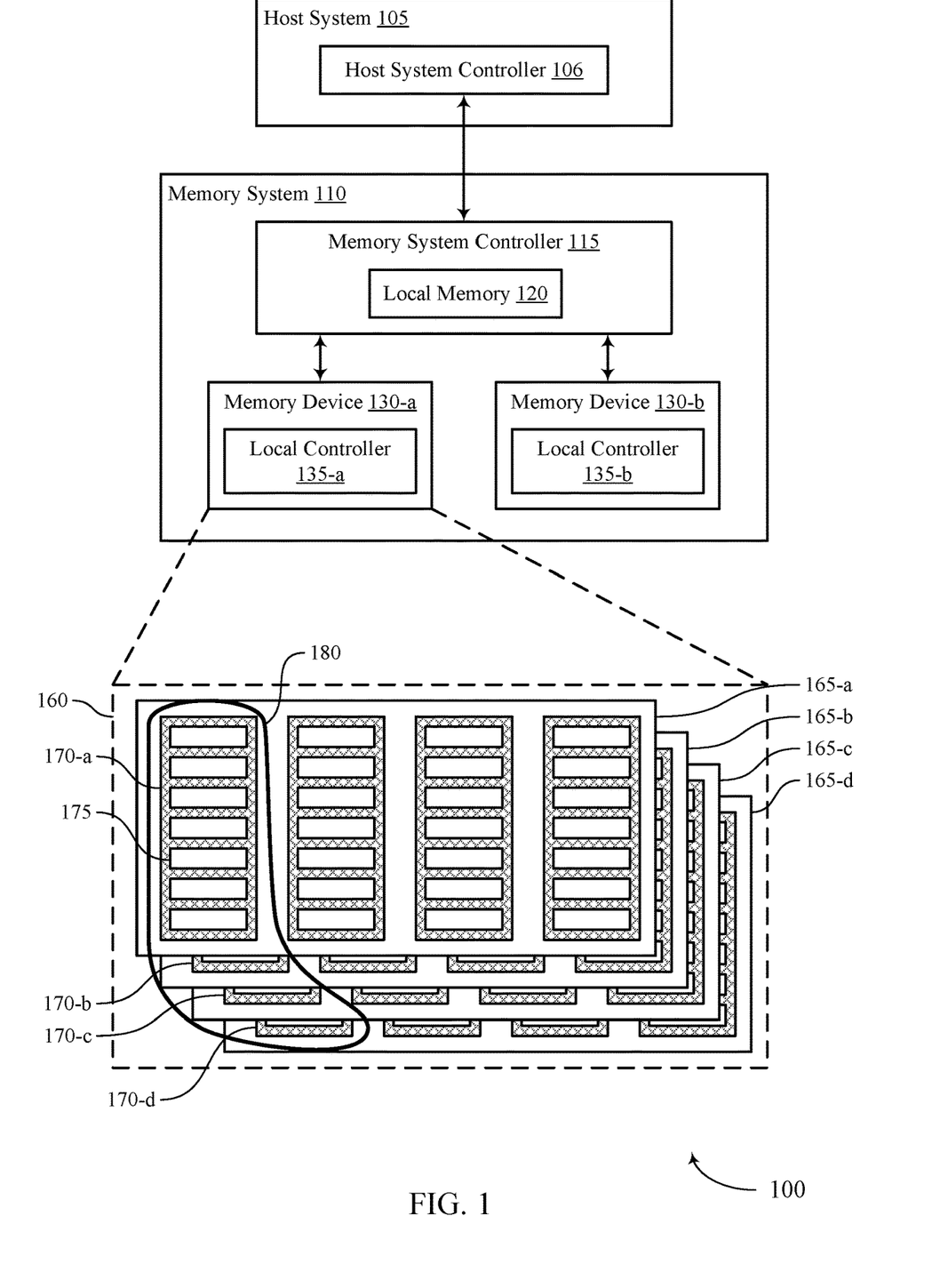
FIG. 1 illustrates an example of a system that supports a dynamic error control configuration for memory systems in accordance with examples as disclosed herein.

Features of the disclosure are initially described in the context of a system with reference to FIG. 1. Features of the disclosure are described in the context of a flow diagram with reference to FIG. 2. These and other features of the disclosure are further illustrated by and described in the context of an apparatus diagram and flowchart that relate to a dynamic error control configuration for memory systems with reference to FIGS. 3-4.

FIG. 1 illustrates an example of a system 100 that supports a dynamic error control configuration for memory systems in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165 c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

The system 100 may include any quantity of non-transitory computer readable media that support a dynamic error control configuration for memory systems. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some examples, the memory system 110 may perform a read operation using a first mode (e.g., a first type of error control operation or a BF mode). For example, the memory system may receive a read command, retrieve a first set of data from a first location of the memory system 110 based on the read command, and perform the first type of error control operation. In some cases, the memory system 110 may determine whether the first set of data includes one or more errors (e.g., determine whether the read operation passes). The memory system 110 may determine that the first set of data includes the one or more errors (e.g., that the first set of data fails to pass the error control operation) and may perform a read retry operation using the first type of error control operation based on the one or more errors. For example, the memory system 110 may retrieve a second set of data from the first location of the memory system 110 in response to determining that the first set of data includes the one or more errors.

In some cases, the memory system 110 may determine whether the second set of data includes one or more errors (e.g., determine whether the read retry operation passes or fails the error control operation). The memory system 110 may determine that the second set of data includes the one or more errors (e.g., that the second set of data fails to pass the error control operation). In such cases, the memory system 110 may determine whether a syndrome weight associated with the first type of error control operation satisfies a threshold. The memory system 110 may determine that the syndrome weight satisfies the threshold and switches operation modes to perform a read retry operation using a second type of error control operation. The second type of error control operation may have a higher-latency and a higher quantity of errors that are detectable or correctable using the second type of error control operation. In such cases, the memory system 110 may perform the second type of error control operation on the second set of data.

Figure 2:
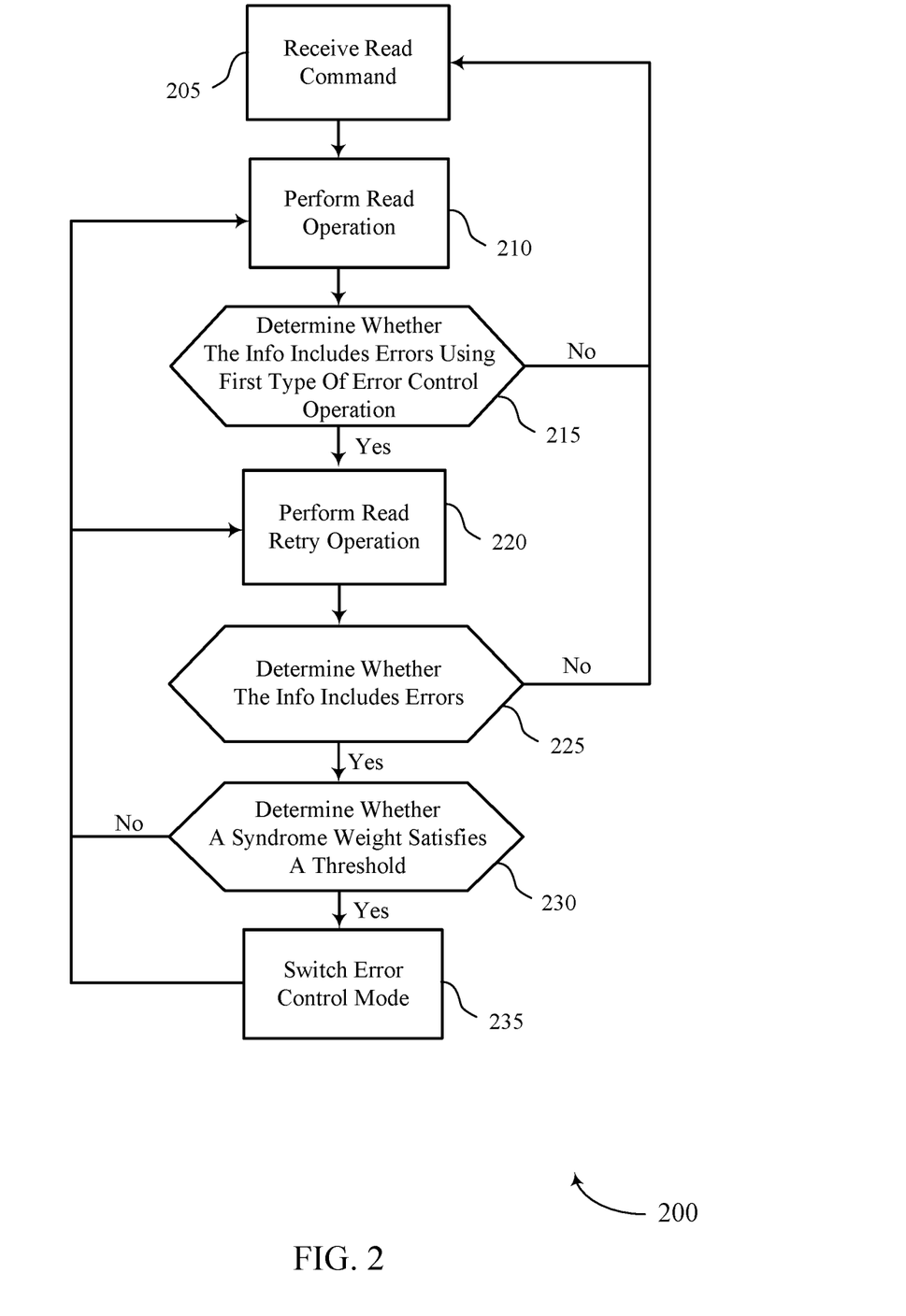
FIG. 2 illustrates an example of a flow diagram that supports a dynamic error control configuration for memory systems in accordance with examples as disclosed herein.

FIG. 2 illustrates an example of a flow diagram 200 that supports a dynamic error control configuration for memory systems in accordance with examples as disclosed herein. For example, the operations of flow diagram 200 may be performed by a memory system as described with reference to FIG. 1. Alternative examples of the following may be implemented, where some steps are performed in a different order or not be performed. Some steps may additionally include additional features not mentioned below. The flow diagram 200 illustrates techniques where a memory system may implement a dynamic error control configuration for memory systems.

Aspects of the flow diagram 200 may be implemented by a controller, among other components. Additionally or alternatively, aspects of the flow diagram 200 may be implemented as instructions stored in a controller (e.g., controller coupled with the memory system). For example, the instructions, if executed by a controller (e.g., the memory system controller 115), may cause the controller to perform the operations of the flow diagram 200.

In some read operations, an error control operation (e.g., LDPC) may be performed to determine whether there are errors in the data retrieved from the NAND. The LDPC may perform iterative operations to flip one or more bits of information and determine whether the data includes errors. Applying error control to information stored in the NAND may help detect or correct (or both) errors that may occur in the information stored in the NAND. For example, errors may occur in response to the information being written into the NAND, the information being read out of the NAND, or disturbances of memory cells of the NAND as part of operations of the NAND. The first type of error control operation may have a lower-latency (e.g., takes less time to perform the operation), lower power consumption, and a lower resolution of quantity of errors that can be detected or corrected, relative to the second type of the error control operation. Example of the first type of error control operation may include a bit-flipping LDPC decoder or other types of LDPC decoders. The second type of error control operation may have a higher-latency (e.g., takes more time to perform the operation), higher power consumption, and a higher resolution of quantity of errors that can be detected or corrected, relative to the first type of the error control operation. Examples of the second type of error control operation may include a min-sum LDPC decoder or other types of LDPC decoders. In some cases, the error control operations may include an error detection operation or error detection code (EDC), an error control operation or error correction code (ECC), a single error correction, double error detection (SECDED) code, or other types of error correction codes.

The second type of error control operation may experience longer processing times and increased latency experienced by the memory system as compared to the first type of error control operation. In some cases, the second type of error control operation may include an increased quantity of iterations, or increases latency per iteration, thereby performing the operation at reduced speeds. The second type of error control operation may be utilized for decoding LDPC code.

A circuit in the memory system may be configured to implement both the first type of error control operation and the second type of error control operation. The first type of error control operation may be an example of an algorithm that may reduce the computational complexity of the circuit in the memory system. For example, the memory system may decode at least one codeword using the circuit and the first type of error control operation where the decoding operation may take 19 microseconds to complete. In other examples, the memory system may decode at least one codeword using the circuit and the second type of error control operation where the decoding operation may take 143 microseconds to complete. The second type of error control operation may identify an increased amount of errors in the retrieved data compared to the first type of error control operation. In such cases, the first type of error control operation may experience shorter processing times but may correct fewer errors in the retrieved data. The first type of error control operation may include a lower latency and a lower error correction capability than the second type of error control operation. In such cases, the first type of error control operation may include a low latency with relative less error correction capability, and the second type of error control operation may include a long latency with more error correction capability.

If the memory system includes bit error rate that is below a threshold, the memory system may perform the first type of error control operation with increased processing times and fewer iterations as compared to the second type of error control operation. In some systems, the memory system may perform the first type of error control operation on the retrieved data and then switch operating modes and perform the second type of error control operation on the retrieved data. Performing both the first type of error control operation and the second type of error control operation without identifying errors may increase the processing time and latency experienced by the memory system. In some systems, the memory system may perform a read retry operation until the retrieved data is free of errors. In some systems, the LDPC operation may be performed for a quantity of iterations until some or all of the bits may be corrected or until an upper limit to the quantity of iterations is satisfied. However, iteratively performing a read retry may increase the recovery time experienced by the memory system.

Techniques are described for initially using a first type of error control operation after read operation to check or decode the retrieved data. If the retrieved data includes errors that is predicted to be likely correctable by the second type of error control operation, then the second type of error control operation may be used. Otherwise, the memory system continues read retry operation by changing read reference voltages or other read methods. In such cases, the memory system may determine whether to switch to the second type of error control operation after performing the first type of error control operation. The memory system may use feedback about the circuit and the first type of error control operation by determining whether a syndrome weight of the first type of error control operation satisfies a threshold. In such cases, the memory system may predict a likelihood that the read operation may pass (e.g., may be free of errors) a second instance of the first type of error control operation based on determining whether the syndrome weight satisfies a threshold.

At 205, a read command may be received. For example, the host system may transmit the read command, and the memory system may receive the read command. The read command may include an indication of a first location of the memory system to perform the read operation. The first location may be an example of a physical address, a logical address, or a combination of addresses to access information in the memory system.

At 210, a read operation may be performed. For example, the memory system may perform the read operation. In such cases, the memory system may identify a location (e.g., physical addresses) of the NAND where the information is stored and retrieve the information from the NAND in response to receiving the read command. In some examples, the memory system may retrieve a first set of data from the first location of a memory system identified in the read command. Retrieving the first set of data from the first location of the memory system may be in direct response to receiving the read command. A set of data my include one or more bits of information. In some cases, a same set of data may be retrieved from a same location in the memory system.

In some cases, the memory device (e.g., the NAND) may include the set of data and error control information (e.g., parity bits) stored at the location. When writing the data, the memory system may generate the error control information and store the error control information with the data in the memory device. The error control information may be configured to help the memory system determine whether the data stored at the location includes one or more errors when retrieving the data from the location. Such techniques may provide greater security for the stored information.

The memory system may include a circuit that may be configured to perform both a first type of error control operation and a second type of error control operation. The memory system may perform the read operation using the first type of error control operation. In such cases, the memory system may perform the first type of error control operation on the first set of data over a first duration in response to retrieving the first set of data. The first type of error control operation may be configured to correct up to a first quantity of errors of the first set of data. The first quantity of errors may be an example of corrupt data, invalid data, discontinuous data, or a combination thereof.

At 215, a determination may be made whether the data includes errors using the first type of error control operation. For example, the memory system may determine whether the first set of data includes one or more errors in response to performing the first type of error control operation. The one or more errors may be an example of the first quantity of errors. The memory system may determine whether the read operation passes (e.g., transmits data). In some examples, the memory system may determine that the data is absent of errors. For example, the memory system may determine that the read operation passes after performing the read operation. The memory system may determine that the data retrieved from the NAND is free of errors.

In response to the memory system determining that the data is free of errors, the memory system may send the data to a buffer to be transmitted to the host system. Additionally or alternatively, the memory system may proceed to perform the next command in a queue. For example, the memory system may perform another read command and may return to 205 or 210 of the method. The memory system may receive another read command and retrieve a third set of data from a second location of the memory system. The second location of the memory system may be different than the first location of the memory system. The second location may be an example of a physical address, a logical address, or a combination of addresses to access information in the memory system. In some cases, the memory system may perform the first type of error control operation on the third set of data at 210 and determine that the one or more errors are absent from the third set of data in response to performing the first type of error control operation at 215. If the retrieved data is absent of errors, the retrieved data may be sent to the host system.

In some cases, the memory system may determine that the data includes the errors at 215. For example, the memory system may determine that the read operation fails to pass after performing the read operation. The memory system may determine that the first set of data retrieved from the NAND includes errors. In such cases, the memory system may perform a read retry operation.

At 220, a read retry operation may be performed. For example, the memory system may retrieve a second set of data from the first location of the memory system in direct response to determining that the first set of data includes the one or more errors. The read retry operation may be an example of a read recovery operation. A read retry may refer be an example of an operation that adjusts a reference voltage used to read data and re-reading the data using the adjusted reference voltage. Read retry operations may be configured to compensate for the charge leakage that occurs due to retention loss or thermal effects or a both. For example, the memory system may perform the read retry operation if the retrieved data includes errors. As part of the read retry, the memory system may adjust the reference voltage used, may retrieve a second set of data from the location in the NAND device, and apply the first error control operation to the second set of data. In some cases, the memory system may perform the first type of error control operation on the second set of data in response to retrieving the second set of data. For example, the read retry operation may use a same operating mode as the read operation (e.g., the first type of error control operation). The read retry operation may include adjusting a reference voltage of the memory system. For example, the memory system may shift the read reference voltage.

After the read retry, if the second set of data includes one or more errors that are uncorrectable using the first type of error control operation, the memory system may check whether the circuit associated with error control has a capability to perform the second type of error control operation, in addition to the first type of error control operation. The second type of error control operation may be configured to correct a higher quantity of errors than the first type of error control operation. The second type of error control operation, however, may take longer (e.g., a higher latency) and may consume more power than the first type of error control operation. If the first type of error control operation is capable of correcting any identified errors, the memory system may refrain from allocating time and resources to perform the second type of error control operation. In such cases, the memory system may refrain from performing the second type of error control operation if the errors may be corrected using a read retry operation and the first type of error control operation.

At 225, a determination may be made whether the data includes errors. For example, the memory system may determine whether the second set of data includes one or more errors in response to performing the read retry operation. In some cases, the memory system may determine that the second set of data includes one or more errors in response to performing the first type of error control operation on the second set of data. The memory system may determine whether the read retry operation passes (e.g., transmits data to the host system).

In some examples, the memory system may determine that the data is absent of errors. For example, the memory system may determine that the retrieved data passes the error control operation after performing the read retry operation. The memory system may determine that the second set of data retrieved from the NAND is free of errors. In such cases, the memory system may proceed to the next phase or next code and receive a read command at 205. If the retrieved data is absent of errors, the retrieved data may be sent to the host system.

In some cases, the memory system may determine that the data includes the errors. For example, the memory system may determine that the read retry operation fails to pass after performing the read retry operation. The memory system may determine that the second set of data retrieved from the NAND includes errors. In such cases, the memory system may determine whether a syndrome weight satisfies a threshold.

At 230, a determination may be made whether the syndrome weight satisfies the threshold. For example, the memory system may determine whether a syndrome weight associated with the first type of error control operation satisfies a threshold in response performing the first type of error control operation. In some cases, the memory system may determine whether a syndrome weight satisfies the threshold in response to determining that the first set of data includes error and determining that the second set of data includes errors. For example, the memory system may determine whether a syndrome weight satisfies the threshold in response to retrieving the second set of data.

The threshold of the syndrome weight may be chosen based on success probability of the second type of error control operation, for example, a value of 600. In such cases, the memory system may determine whether the syndrome weight is above or below 600. The syndrome weight may be an example of an approximate indication of how many bits are in error in the codeword. If the syndrome weight is high (e.g., above a threshold), the syndrome weight may indicate that a low probability that the codeword may be corrected by the second type of error control operation. If the syndrome weight is low (e.g., below a threshold), the syndrome weight may indicate that a high probability that the codeword may be corrected by the first type of error control operation. The syndrome weight may be an indication of chance of successful decoding by the second type of error control operation, given that the first type of error control operation already failed to correct the codeword.

In some cases, the memory system may determine that the syndrome weight fails to satisfy the threshold. In some cases, the memory system may determine that the memory system may not be close to correcting the errors (e.g., unable to correct the remaining errors using the first type of error control operation or the second type of error control operation, depending on which type is used on the retrieved data) and a read retry operation may be selected to reduce a number of errors in the read. In such cases, the memory system may proceed to perform the read retry operation at 220.

In some examples, the memory system may determine that the syndrome weight associated with the first type of error control operation performed on a third set of data retrieved from a second location of the memory system fails to satisfy a threshold. At 220, the memory system may retrieve a fourth set of data from the second location of the memory system in response to determining that the syndrome weight fails to satisfy the threshold. The memory system may perform the first type of error control operation on the fourth set of data in direct response to determining that the syndrome weight fails to satisfy the threshold. For example, the memory system may perform the read retry operation using the first type of error control operation.

In other examples, the memory system may determine that the syndrome weight satisfies the threshold at 230. In such cases, the memory system may try to correct the codeword. The memory system may determine that the memory system may be close to correcting the errors (e.g., able to correct the errors using the second type of error control operation). In response to determining that the syndrome weight satisfies the threshold (e.g., is below the threshold), the memory system may switch to the second type of error control operation.

At 235, a switch of the error control mode may occur. For example, the memory system may cause the circuit to use the second type of error control operation as part of a read operation. The memory system may switch to the second type of error control operation and read the data again and use the second type of error control operation to detect and/or correct errors in the data. The memory system may proceed to 210 or 220 to perform a second type of error control operation on the second set of data based on retrieving the second set of data. The second type of error control operation may be configured to identify up to a second quantity of errors different than a first quantity of errors that may be identifiable by the first error control operation. The second quantity of errors may be an example of corrupt data, invalid data, discontinuous data, or a combination thereof.

Based on switching to the second type of error control operation and proceeding to 210 or 220, the memory system may determine whether the read operation passes at 215 or 225 after performing the read operation using the second type of error control operation. For example, the memory system may determine whether the second set of data includes one or more errors in response to performing the second type of error control operation on the second set of data. The memory system may transmit a notification to the host system that the second set of data includes the one or more errors in response to determining that the second set of data includes the one or more errors. In other examples, the memory system may transmit the second set of data to a host system in response to determining that the second set of data fails to include the one or more errors.

In some cases, performing the second type of error control operation on the second set of data may be in response to determining that the second set of data includes the one or more errors, determining that the syndrome weight satisfies the threshold, or both. By performing the second type of error control operation when the success probability is high, the memory system may experience improved operating times, reduced latency, and increased efficiency.

In some examples, the memory system may perform different read operations in conjunction with performing the first type of error control operation and performing the second type of error control operation. For example, the memory system may perform a first type of read operation with the first type of error control operation. In some cases, the first type of read operation may be an example of the memory system performing a read retry. In such cases, the memory system may experience decreased latency and decreased correction capability.

In other examples, the memory system may perform a second type of read operation (e.g., a read retry) with the first type of error control operation. The second type of read operation may be an example of performing the read operation multiple times (e.g., more than once) and performing the error control operation.

The memory system may perform the first type of the read operation or the second type of read operation with the second type of error control operation. In some cases, the second type of read operation may be an example of the memory system performing an internal read search or compensation and adjusting the read based on the read search. In such cases, the memory system may experience increased and increased resolution. In such cases, the memory system may improve the NAND read performance by combining a first or second type of read operations with the first or second type of error control operations.

Figure 3:
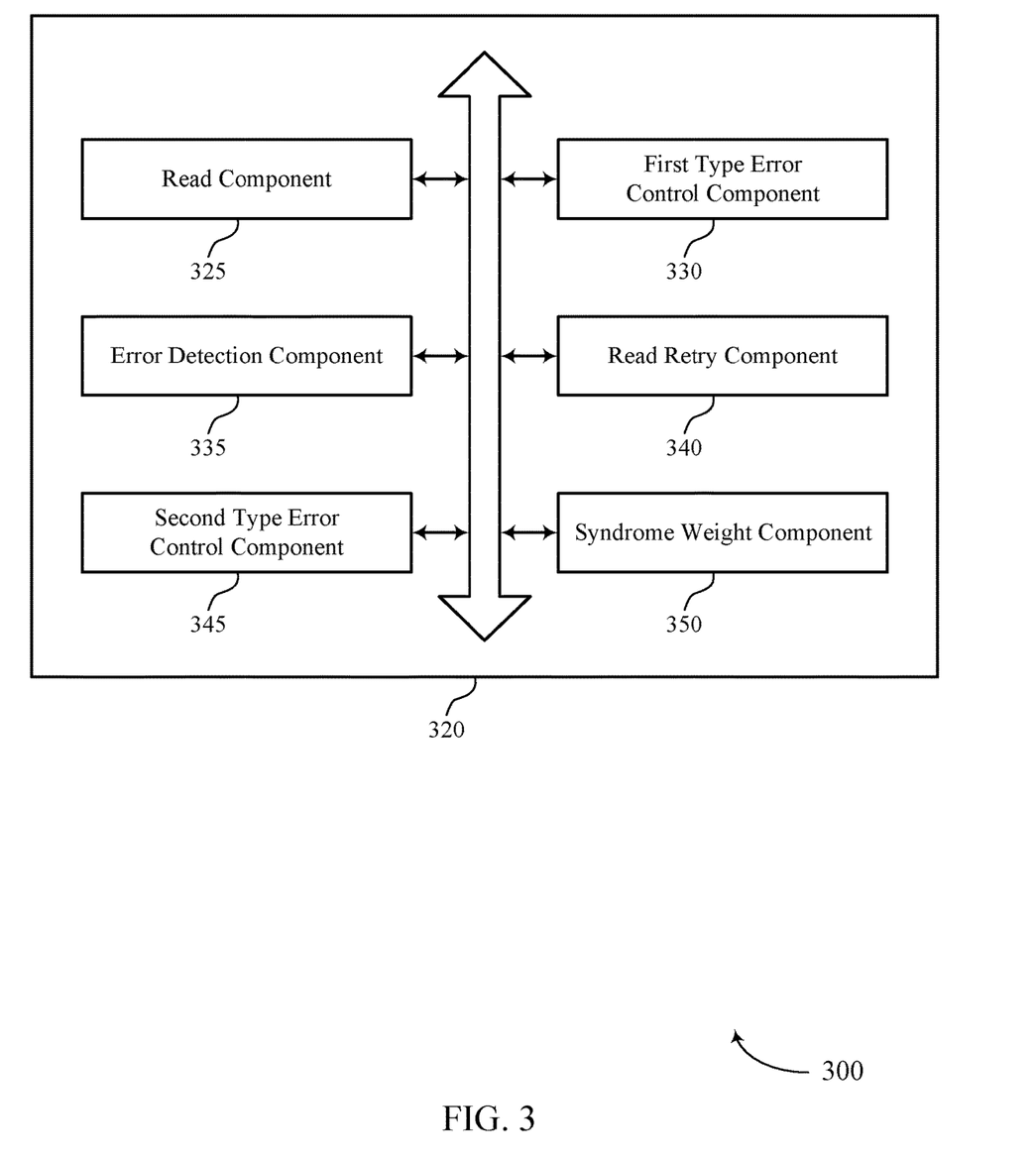
FIG. 3 shows a block diagram of a memory system that supports a dynamic error control configuration for memory systems in accordance with examples as disclosed herein.

FIG. 3 shows a block diagram 300 of a memory system 320 that supports a dynamic error control configuration for memory systems in accordance with examples as disclosed herein. The memory system 320 may be an example of aspects of a memory system as described with reference to FIGS. 1 through 2. The memory system 320, or various components thereof, may be an example of means for performing various aspects of a dynamic error control configuration for memory systems as described herein. For example, the memory system 320 may include a read component 325, a first type error control component 330, an error detection component 335, a read retry component 340, a second type error control component 345, a syndrome weight component 350, or any combination thereof. Each of these components may communicate, directly or indirectly, with one another (e.g., via one or more buses).

The read component 325 may be configured as or otherwise support a means for retrieving a first set of data from a first location of a memory system based at least in part on a read command. The first type error control component 330 may be configured as or otherwise support a means for performing a first type of error control operation on the first set of data over a first duration based at least retrieving the first set of data, the first type of error control operation configured to identify up to a first quantity of errors. The error detection component 335 may be configured as or otherwise support a means for determining whether the first set of data includes one or more errors based at least in part on performing the first type of error control operation. The read retry component 340 may be configured as or otherwise support a means for retrieving a second set of data from the first location of the memory system based at least in part on determining that the first set of data includes the one or more errors. The syndrome weight component 350 may be configured as or otherwise support a means for determining whether a syndrome weight associated with the first type of error control operation satisfies a threshold based at least in part retrieving the second set of data. The second type error control component 345 may be configured as or otherwise support a means for performing a second type of error control operation on the second set of data over a second duration based at least in part on retrieving the second set of data and determining that the syndrome weight satisfies the threshold, the second type of error control operation configured to identify up to a second quantity of errors.

In some examples, the read component 325 may be configured as or otherwise support a means for retrieving a third set of data from a second location of the memory system. In some examples, the error detection component 335 may be configured as or otherwise support a means for determining that the one or more errors are absent from the third set of data based at least in part on performing the first type of error control operation on the third set of data. In some examples, the read component 325 may be configured as or otherwise support a means for retrieving a fourth set of data from a third location of the memory system based at least in part on determining that the one or more errors are absent from the third set of data.

In some examples, the syndrome weight component 350 may be configured as or otherwise support a means for determining that a syndrome weight associated with the first type of error control operation performed on a third set of data retrieved from a second location of the memory system fails to satisfy a threshold. In some examples, the read retry component 340 may be configured as or otherwise support a means for retrieving a fourth set of data from the second location of the memory system based at least in part on determining that the syndrome weight fails to satisfy the threshold. In some examples, the first type error control component 330 may be configured as or otherwise support a means for performing the first type of error control operation on the fourth set of data based at least in part on determining that the syndrome weight fails to satisfy the threshold.

In some examples, the error detection component 335 may be configured as or otherwise support a means for determining whether the second set of data includes one or more errors based at least in part on performing the second type of error control operation on the second set of data.

In some examples, the error detection component 335 may be configured as or otherwise support a means for transmitting a notification to a host system that the second set of data includes the one or more errors based at least in part on determining that the second set of data includes the one or more errors.

In some examples, the error detection component 335 may be configured as or otherwise support a means for transmitting the second set of data to a host system based at least in part on determining that the second set of data fails to include the one or more errors.

In some examples, the first type error control component 330 may be configured as or otherwise support a means for performing the first type of error control operation on the second set of data based at least in part on retrieving the second set of data. In some examples, the error detection component 335 may be configured as or otherwise support a means for determining that the second set of data includes one or more errors based at least on performing the first type of error control operation on the second set of data, where performing the second type of error control operation on the second set of data is based at least in part on determining that the second set of data includes the one or more errors.

In some examples, the read component 325 may be configured as or otherwise support a means for receiving, from a host system, the read command that includes an indication of the first location, where retrieving the first set of data from the first location of the memory system is based at least in part on receiving the read command.

In some examples, the first type of error control operation includes a lower latency and a lower error correction capability than the second type of error control operation.

Figure 4:
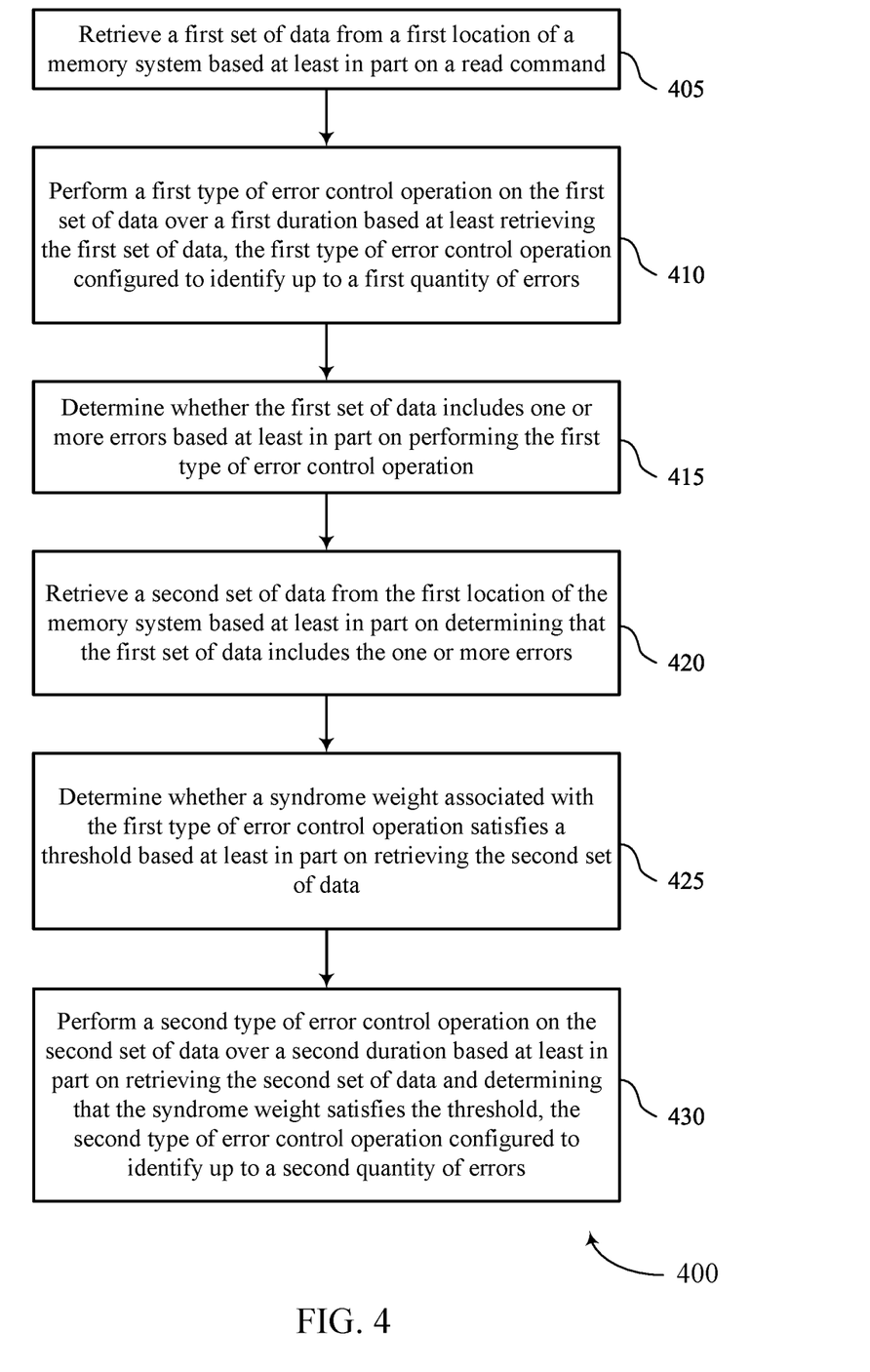
FIG. 4 shows a flowchart illustrating a method or methods that support a dynamic error control configuration for memory systems in accordance with examples as disclosed herein.

FIG. 4 shows a flowchart illustrating a method 400 that supports a dynamic error control configuration for memory systems in accordance with examples as disclosed herein. The operations of method 400 may be implemented by a memory system or its components as described herein. For example, the operations of method 400 may be performed by a memory system as described with reference to FIGS. 1 through 3. In some examples, a memory system may execute a set of instructions to control the functional elements of the device to perform the described functions. Additionally or alternatively, the memory system may perform aspects of the described functions using special-purpose hardware.

At 405, a first set of data may be retrieved. For example, the method may include retrieving a first set of data from a first location of a memory system based at least in part on a read command. The operations of 405 may be performed in accordance with examples as disclosed herein. In some examples, aspects of the operations of 405 may be performed by a read component 325 as described with reference to FIG. 3.

At 410, a first type of error control operation may be performed. For example, the method may include performing a first type of error control operation on the first set of data over a first duration based at least retrieving the first set of data, the first type of error control operation configured to identify up to a first quantity of errors. The operations of 410 may be performed in accordance with examples as disclosed herein. In some examples, aspects of the operations of 410 may be performed by a first type error control component 330 as described with reference to FIG. 3.

At 415, a determination may be made. For example, the method may include determining whether the first set of data includes one or more errors based at least in part on performing the first type of error control operation. The operations of 415 may be performed in accordance with examples as disclosed herein. In some examples, aspects of the operations of 415 may be performed by an error detection component 335 as described with reference to FIG. 3.

At 420, a second set of data may be retrieved. For example, the method may include retrieving a second set of data from the first location of the memory system based at least in part on determining that the first set of data includes the one or more errors. The operations of 420 may be performed in accordance with examples as disclosed herein. In some examples, aspects of the operations of 420 may be performed by a read retry component 340 as described with reference to FIG. 3.

At 425, a syndrome weight may be determined. For example, the method ma include determining whether a syndrome weight associated with the first type of error control operation satisfies a threshold based at least in part retrieving the second set of data. The operations of 425 may be performed in accordance with examples as disclosed herein. In some examples, aspects of the operations of 425 may be performed by a syndrome weight component 350 as described with reference to FIG. 3.

At 430, a second type of error control operation may be performed. For example, the method may include performing a second type of error control operation on the second set of data over a second duration based at least in part on retrieving the second set of data, the second type of error control operation configured to identify up to a second quantity of errors. The operations of 430 may be performed in accordance with examples as disclosed herein. In some examples, aspects of the operations of 430 may be performed by a second type error control component 345 as described with reference to FIG. 3.

In some examples, an apparatus as described herein may perform a method or methods, such as the method 400. The apparatus may include, features, circuitry, logic, means, or instructions (e.g., a non-transitory computer-readable medium storing instructions executable by a processor) for retrieving a first set of data from a first location of a memory system based at least in part on a read command, performing a first type of error control operation on the first set of data over a first duration based at least retrieving the first set of data, the first type of error control operation configured to identify up to a first quantity of errors, determining whether the first set of data includes one or more errors based at least in part on performing the first type of error control operation, retrieving a second set of data from the first location of the memory system based at least in part on determining that the first set of data includes the one or more errors, determining whether a syndrome weight associated with the first type of error control operation satisfies a threshold based at least in part on retrieving the second set of data, and performing a second type of error control operation on the second set of data over a second duration based at least in part on retrieving the second set of data and determining that the syndrome weight satisfies the threshold, the second type of error control operation configured to identify up to a second quantity of errors.

Some examples of the method 400 and the apparatus described herein may further include operations, features, circuitry, logic, means, or instructions for retrieving a third set of data from a second location of the memory system, determining that the one or more errors may be absent from the third set of data based at least in part on performing the first type of error control operation on the third set of data, and retrieving a fourth set of data from a third location of the memory system based at least in part on determining that the one or more errors may be absent from the third set of data.

Some examples of the method 400 and the apparatus described herein may further include operations, features, circuitry, logic, means, or instructions for determining that a syndrome weight associated with the first type of error control operation performed on a third set of data retrieved from a second location of the memory system fails to satisfy a threshold, retrieving a fourth set of data from the second location of the memory system based at least in part on determining that the syndrome weight fails to satisfy the threshold, and performing the first type of error control operation on the fourth set of data based at least in part on determining that the syndrome weight fails to satisfy the threshold.

Some examples of the method 400 and the apparatus described herein may further include operations, features, circuitry, logic, means, or instructions for determining whether the second set of data includes one or more errors based at least in part on performing the second type of error control operation on the second set of data.

Some examples of the method 400 and the apparatus described herein may further include operations, features, circuitry, logic, means, or instructions for transmitting a notification to a host system that the second set of data includes the one or more errors based at least in part on determining that the second set of data includes the one or more errors.

Some examples of the method 400 and the apparatus described herein may further include operations, features, circuitry, logic, means, or instructions for transmitting the second set of data to a host system based at least in part on determining that the second set of data fails to include the one or more errors.

Some examples of the method 400 and the apparatus described herein may further include operations, features, circuitry, logic, means, or instructions for performing the first type of error control operation on the second set of data based at least in part on retrieving the second set of data and determining that the second set of data includes one or more errors based at least on performing the first type of error control operation on the second set of data, where performing the second type of error control operation on the second set of data may be based at least in part on determining that the second set of data includes the one or more errors.

Some examples of the method 400 and the apparatus described herein may further include operations, features, circuitry, logic, means, or instructions for receiving, from a host system, the read command that includes an indication of the first location, where retrieving the first set of data from the first location of the memory system may be based at least in part on receiving the read command.

In some examples of the method 400 and the apparatus described herein, the first type of error control operation includes a lower latency and a lower error correction capability than the second type of error control operation.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
a memory device;
a controller coupled with the memory device and configured to cause the apparatus to:
retrieve a first set of data from a first location of a memory system based at least in part on a read command;
perform a first type of error control operation on the first set of data over a first duration based at least retrieving the first set of data, the first type of error control operation configured to identify up to a first quantity of errors;
determine whether the first set of data includes one or more errors based at least in part on performing the first type of error control operation;
retrieve a second set of data from the first location of the memory system based at least in part on determining that the first set of data includes the one or more errors;
determine whether a syndrome weight associated with the first type of error control operation satisfies a threshold based at least in part on retrieving the second set of data; and
perform a second type of error control operation on the second set of data over a second duration based at least in part on retrieving the second set of data and determining that the syndrome weight satisfies the threshold, the second type of error control operation configured to identify up to a second quantity of errors.

2. The apparatus of claim 1, wherein the controller is further configured to cause the apparatus to:
retrieve a third set of data from a second location of the memory system;
determine that the one or more errors are absent from the third set of data based at least in part on performing the first type of error control operation on the third set of data; and
retrieve a fourth set of data from a third location of the memory system based at least in part on determining that the one or more errors are absent from the third set of data.

3. The apparatus of claim 1, wherein the controller is further configured to cause the apparatus to:
determine that the syndrome weight associated with the first type of error control operation performed on a third set of data retrieved from a second location of the memory system fails to satisfy the threshold;
retrieve a fourth set of data from the second location of the memory system based at least in part on determining that the syndrome weight fails to satisfy the threshold; and
perform the first type of error control operation on the fourth set of data based at least in part on determining that the syndrome weight fails to satisfy the threshold.

4. The apparatus of claim 1, wherein the controller is further configured to cause the apparatus to:
determine whether the second set of data includes one or more errors based at least in part on performing the second type of error control operation on the second set of data.

5. The apparatus of claim 4, wherein the controller is further configured to cause the apparatus to:
transmit a notification to a host system that the second set of data includes the one or more errors based at least in part on determining that the second set of data includes the one or more errors.

6. The apparatus of claim 4, wherein the controller is further configured to cause the apparatus to:
transmit the second set of data to a host system based at least in part on determining that the second set of data fails to include the one or more errors.

7. The apparatus of claim 1, wherein the controller is further configured to cause the apparatus to:
perform the first type of error control operation on the second set of data based at least in part on retrieving the second set of data; and
determine that the second set of data includes one or more errors based at least on performing the first type of error control operation on the second set of data, wherein performing the second type of error control operation on the second set of data is based at least in part on determining that the second set of data includes the one or more errors.

8. The apparatus of claim 1, wherein the controller is further configured to cause the apparatus to:

receive, from a host system, the read command that includes an indication of the first location, wherein retrieving the first set of data from the first location of the memory system is based at least in part on receiving the read command.

9. The apparatus of claim 1, wherein the first type of error control operation comprises a lower latency and a lower error correction capability than the second type of error control operation.

10. A non-transitory computer-readable medium storing code comprising instructions, which when executed by a processor of an electronic device, cause the electronic device to:
retrieve a first set of data from a first location of a memory system based at least in part on a read command;
perform a first type of error control operation on the first set of data over a first duration based at least retrieving the first set of data, the first type of error control operation configured to identify up to a first quantity of errors;
determine whether the first set of data includes one or more errors based at least in part on performing the first type of error control operation;
retrieve a second set of data from the first location of the memory system based at least in part on determining that the first set of data includes the one or more errors;
determine whether a syndrome weight associated with the first type of error control operation satisfies a threshold based at least in part on retrieving the second set of data; and
perform a second type of error control operation on the second set of data over a second duration based at least in part on retrieving the second set of data and determining that the syndrome weight satisfies the threshold, the second type of error control operation configured to identify up to a second quantity of errors.

11. The non-transitory computer-readable medium of claim 10, wherein the instructions are further executable by the processor to:
retrieve a third set of data from a second location of the memory system;
determine that the one or more errors are absent from the third set of data based at least in part on performing the first type of error control operation on the third set of data; and
retrieve a fourth set of data from a third location of the memory system based at least in part on determining that the one or more errors are absent from the third set of data.

12. The non-transitory computer-readable medium of claim 10, wherein the instructions, when executed by the processor of the electronic device, further cause the electronic device to:
determine that the syndrome weight associated with the first type of error control operation performed on a third set of data retrieved from a second location of the memory system fails to satisfy the threshold;
retrieve a fourth set of data from the second location of the memory system based at least in part on determining that the syndrome weight fails to satisfy the threshold; and
perform the first type of error control operation on the fourth set of data based at least in part on determining that the syndrome weight fails to satisfy the threshold.

13. The non-transitory computer-readable medium of claim 10, wherein the instructions, when executed by the processor of the electronic device, further cause the electronic device to:
determine whether the second set of data includes one or more errors based at least in part on performing the second type of error control operation on the second set of data.

14. The non-transitory computer-readable medium of claim 13, wherein the instructions, when executed by the processor of the electronic device, further cause the electronic device to:
transmit a notification to a host system that the second set of data includes the one or more errors based at least in part on determining that the second set of data includes the one or more errors.

15. The non-transitory computer-readable medium of claim 13, wherein the instructions, when executed by the processor of the electronic device, further cause the electronic device to:
transmit the second set of data to a host system based at least in part on determining that the second set of data fails to include the one or more errors.

16. The non-transitory computer-readable medium of claim 10, wherein the instructions, when executed by the processor of the electronic device, further cause the electronic device to:
perform the first type of error control operation on the second set of data based at least in part on retrieving the second set of data; and
determine that the second set of data includes one or more errors based at least on performing the first type of error control operation on the second set of data, wherein performing the second type of error control operation on the second set of data is based at least in part on determining that the second set of data includes the one or more errors.

17. The non-transitory computer-readable medium of claim 10, wherein the instructions, when executed by the processor of the electronic device, further cause the electronic device to:
receive, from a host system, the read command that includes an indication of the first location, wherein retrieving the first set of data from the first location of the memory system is based at least in part on receiving the read command.

18. The non-transitory computer-readable medium of claim 10, wherein the first type of error control operation comprises a lower latency and a lower error correction capability than the second type of error control operation.

19. A method, comprising:
retrieving a first set of data from a first location of a memory system based at least in part on a read command;
performing a first type of error control operation on the first set of data over a first duration based at least retrieving the first set of data, the first type of error control operation configured to identify up to a first quantity of errors;
determining whether the first set of data includes one or more errors based at least in part on performing the first type of error control operation;
retrieving a second set of data from the first location of the memory system based at least in part on determining that the first set of data includes the one or more errors;

determining whether a syndrome weight associated with the first type of error control operation satisfies a threshold based at least in part on retrieving the second set of data; and performing a second type of error control operation on the second set of data over a second duration based at least in part on retrieving the second set of data and determining that the syndrome weight satisfies the threshold, the second type of error control operation configured to identify up to a second quantity of errors.

20. The method of claim 19, further comprising:

retrieving a third set of data from a second location of the memory system;

determining that the one or more errors are absent from the third set of data based at least in part on performing the first type of error control operation on the third set of data; and retrieving a fourth set of data from a third location of the memory system based at least in part on determining that the one or more errors are absent from the third set of data.

21. The method of claim 19, further comprising:

determining that the syndrome weight associated with the first type of error control operation performed on a third set of data retrieved from a second location of the memory system fails to satisfy the threshold;

retrieving a fourth set of data from the second location of the memory system based at least in part on determining that the syndrome weight fails to satisfy the threshold; and performing the first type of error control operation on the fourth set of data based at least in part on determining that the syndrome weight fails to satisfy the threshold.

22. The method of claim 19, further comprising:

determining whether the second set of data includes one or more errors based at least in part on performing the second type of error control operation on the second set of data.

23. The method of claim 22, further comprising:

transmitting a notification to a host system that the second set of data includes the one or more errors based at least in part on determining that the second set of data includes the one or more errors.

24. The method of claim 22, further comprising:

transmitting the second set of data to a host system based at least in part on determining that the second set of data fails to include the one or more errors.

25. The method of claim 19, further comprising:

performing the first type of error control operation on the second set of data based at least in part on retrieving the second set of data; and determining that the second set of data includes one or more errors based at least on performing the first type of error control operation on the second set of data, wherein performing the second type of error control operation on the second set of data is based at least in part on determining that the second set of data includes the one or more errors.

* * * * *